(12) United States Patent
Brudeseth

(10) Patent No.: US 7,003,608 B2
(45) Date of Patent: Feb. 21, 2006

(54) METHOD AND SYSTEM FOR AUTOMATIC CONFIGURATION OF IDE BUS DEVICES

(75) Inventor: Rolf Brudeseth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/460,421

(22) Filed: Jun. 12, 2003

(65) Prior Publication Data

US 2004/0255065 A1 Dec. 16, 2004

(51) Int. Cl.
*G06F 13/00* (2006.01)
*G06F 13/14* (2006.01)

(52) U.S. Cl. .................... 710/110; 710/10; 710/301; 710/305; 439/638

(58) Field of Classification Search ............ 710/8, 710/10, 14, 104, 110, 303, 305; 711/114; 439/497–499, 639
See application file for complete search history.

(56) References Cited

U.S. PATENT DOCUMENTS

| | | | | |
|---|---|---|---|---|
| 5,519,882 A | * | 5/1996 | Asano et al. ............. | 710/10 |
| 5,649,233 A | * | 7/1997 | Chen ........................ | 710/8 |
| 5,740,397 A | * | 4/1998 | Levy ........................ | 711/114 |
| 5,761,460 A | * | 6/1998 | Santos et al. ............. | 710/305 |
| 6,016,518 A | * | 1/2000 | Matsushima et al. ...... | 710/8 |
| 6,024,607 A | * | 2/2000 | Wahl ........................ | 439/639 |
| 6,457,083 B1 | * | 9/2002 | Schober et al. ........... | 710/305 |
| 6,553,432 B1 | * | 4/2003 | Critz et al. ............... | 710/10 |
| 6,647,436 B1 | * | 11/2003 | Jedrzejewski et al. .... | 710/14 |
| 6,779,068 B1 | * | 8/2004 | Kim ......................... | 710/303 |
| 2002/0156961 A1 | * | 10/2002 | Koide ...................... | 710/305 |
| 2003/0051085 A1 | * | 3/2003 | Chung ..................... | 710/104 |
| 2003/0154330 A1 | * | 8/2003 | Bolt ......................... | 710/8 |
| 2004/0039858 A1 | * | 2/2004 | Yu et al. .................. | 710/110 |
| 2004/0133725 A1 | * | 7/2004 | Wu et al. ................. | 710/110 |

FOREIGN PATENT DOCUMENTS

JP 2001-135010 * 5/2001

* cited by examiner

*Primary Examiner*—Glenn A. Auve
*Assistant Examiner*—Christopher E. Lee
(74) *Attorney, Agent, or Firm*—Duke W. Yee; Mark E. McBurney; Brian D. Owens

(57) ABSTRACT

A system and method are disclosed for automatically and correctly configuring IDE bus devices to be either master or slave devices regardless of the devices' location on an IDE cable. A modified IDE cable is described for causing an IDE device set to cable select mode to automatically configure itself appropriately as either a master or a slave device. The modified cable includes means for setting the cable select value to a master value when the IDE device is coupled to the cable's middle connector, for setting the cable select value to a slave value when the IDE device is coupled to the cable's end connector while a second IDE device is coupled to the middle connector, and for setting the cable select value to a master value when the IDE device is coupled to the end connector while no device is coupled to the middle connector.

13 Claims, 3 Drawing Sheets

METHOD AND SYSTEM FOR AUTOMATIC CONFIGURATION OF IDE BUS DEVICES

BACKGROUND OF THE INVENTION

1. Technical Field

The present invention relates generally to the field of data processing systems, and more specifically to a method and system for automatically configuring IDE bus devices appropriately as master or slave devices regardless of the devices' location on an IDE cable.

2. Description of Related Art

As described in the ATA specification, an IDE device has three possible configuration settings: master, slave, or cable select. A jumper is provided on each device that is used to select the appropriate configuration setting for that device. Thus, either master, slave, or cable select may be selected for each device using the device's jumper.

The various IDE devices are coupled together utilizing a cable that also adheres to the ATA specification. The IDE cable has three connectors. The connector attached to the controller, or host, is at one end. The connectors at the opposite end and in the middle of the cable are attached to the master and slave devices. In the case where a device has been configured in the cable select mode by the jumper, the device will sense the CSEL signal on the IDE bus and will configure itself to either master or slave according to the device's position on the cable. As described in the ATA specification, a device which determines that its CSEL pin is at a logical zero will configure itself as a master, and a device which determines that its CSEL pin is at a logical one will configure itself as a slave. A device configured as a cable select device that is attached to the connector at the end of the cable will become the slave device, while a device configured as a cable select device that is attached to the connector in the middle of the cable will become the master device.

In the case where a device has been configured by the jumper to be either a master or a slave device, the location of the device on the IDE bus has no impact on the device's mode. Thus, if a device that has been configured by the jumper to be a master device is coupled to the end connector, the device will operate as a master device. Similarly, if a device has been configured by the jumper to be a slave device and that device is coupled to the middle connector, the device will operate as a slave device.

FIG. 4 illustrates a cable 400 that conforms to the ATA specification for IDE cables in accordance with the prior art. The ATA specification defines a number of different pins and their functions, as well as a host connector 402, a middle connector 404, and an end connector 406. Host connector 402 is used to couple cable 400 to an IDE host controller, such as host 510, see FIG. 5B. An IDE device, such as device 500, see FIG. 5A, that is configured as a cable select device and that is coupled to middle connector 404 will operate in master mode. Any IDE device that is configured as a cable select device and that is coupled to end connector 406 will operate in slave mode.

Three wires of cable 400 are depicted in FIG. 4. The ATA specification defines several ground wires, such as ground 408 and 410. The specification also defines a CSEL wire depicted as 412. According to the specification, the CSEL pin 414 in middle connector 404 will be grounded through 412 when connector 402 is coupled to host 510. The CSEL pin 416 on end connector 406 is open.

FIG. 5A depicts internal connections within an IDE device 500 of selected pins in accordance with the prior art. Pins 502 and 506 are grounded within device 500. The CSEL wire is received within device 500 at pin 504 which is coupled to a voltage source, which is 5 Volts according to the ATA specification, through a resistor. In this manner, when device 500 is coupled to middle connector 404, pin 502 is coupled to wire 408, and pin 506 is coupled to wire 410. Pin 504 is coupled to pin 414 which causes pin 504 to be pulled to ground, and thus device 500 will act as a master device because pin 504 is at a logical zero. When device 500 is coupled to end connector 406, pin 504 will be at 5 Volts, and thus device 500 will act as a slave device because pin 504 is at a logical one.

As depicted by FIG. 5B, when host 510 is coupled to host connector 402, pin 512 is coupled to ground wire 408, pin 514, is coupled to ground wire 410, and CSEL pin 516 is coupled to CSEL wire 412.

In the prior art, if the devices are not jumpered for CSEL mode, it would be possible to have either two master devices or two slave devices existing on a single cable, resulting in errors. Furthermore, in CSEL mode it is possible to have a slave device present without a master device attached. This is typically not recommended. Therefore, a need exists for a method and system for automatically configuring IDE bus devices appropriately as master or slave devices regardless of the devices' location on an IDE cable.

SUMMARY OF THE INVENTION

A system and method are disclosed for automatically and correctly configuring IDE bus devices to be either master or slave devices regardless of the devices' location on an IDE cable. A modified IDE cable is described for causing IDE devices set by a jumper to cable select mode to automatically configure themselves appropriately as either master or slave devices regardless of the IDE devices' location on the modified IDE cable. One connector is set to master mode. The second connector will be set to slave or master mode depending upon whether the first connector has a device attached to it or not, respectively. The IDE devices include a cable select pin where the IDE devices utilize a value of the cable select pin to determine whether the IDE devices should be configured as a master or a slave. An IDE device is a master when the value of its cable select pin is a master value and is a slave when the value of its cable select pin is a slave value. The modified cable includes a host connector for coupling to a host controller, a middle connector, an end connector, and means for setting the value to the master value when the IDE device is coupled to the middle connector, for setting the value to the slave value when the IDE device is coupled to the end connector while a second IDE device is coupled to the middle connector, and for setting the value to the master value when the IDE device is coupled to the end connector while the middle connector has no device attached.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method and system for automatically configuring IDE bus devices appropriately as either master or slave devices regardless of the devices' location on an IDE cable. The present invention senses whether any device has been attached to the connector in the middle of the cable. If a device has been attached to the middle connector, that attached device will become the master while any device that is attached to the end connector will become the slave device. If the present invention determines that no device is attached to the middle connector and a device is attached to the end connector, the device attached to the end connector will become the master.

Figure 1:
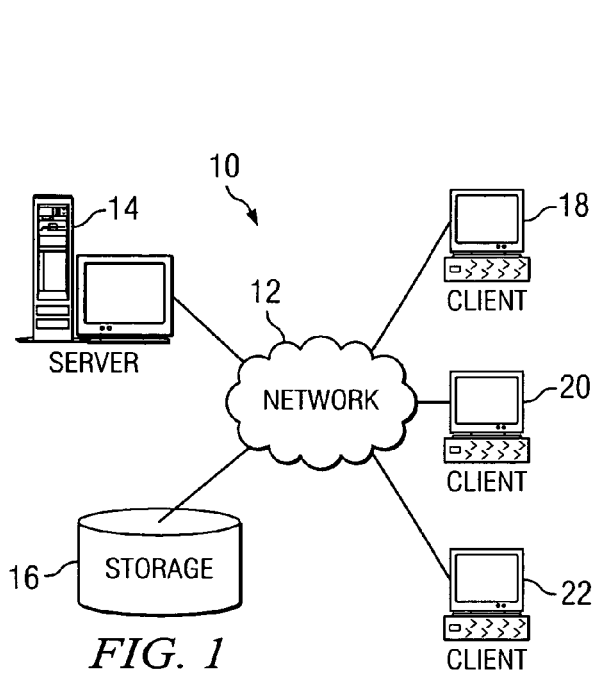
FIG. 1 is a pictorial representation which depicts a data processing system in which the present invention may be implemented.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

Figure 2:
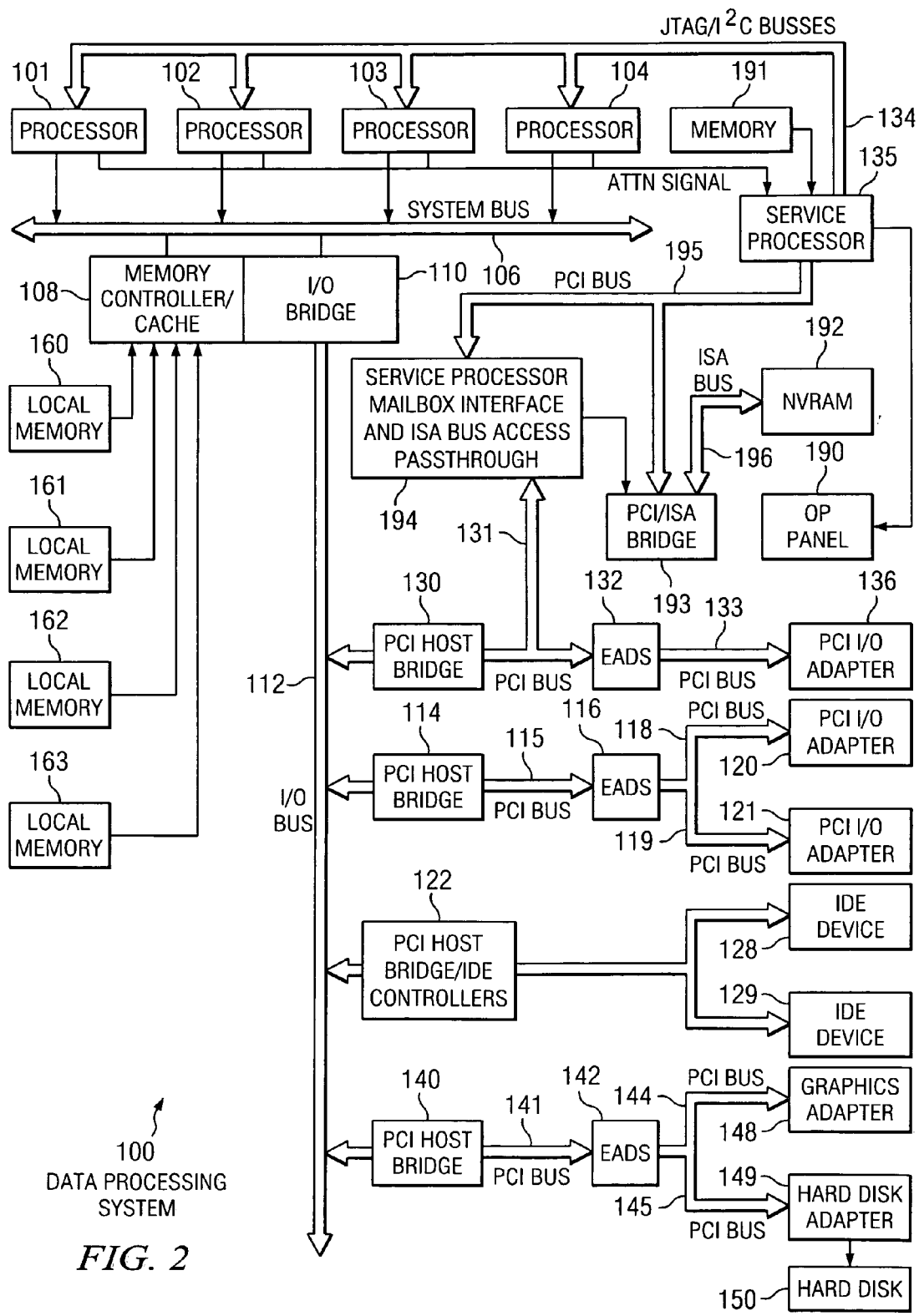
FIG. 2 is a more detailed illustration of a computer system that may be used to implement any of the computer systems of FIG. 1 in accordance with the present invention.

FIG. 2 illustrates a block diagram of a data processing system in which the present invention may be implemented in accordance with the present invention. Data processing system 100 includes a plurality of processors 101, 102, 103, and 104 connected to system bus 106. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 may be logically partitioned such that different I/O adapters 120–121, 136, and 148–149 may be assigned to different logical partitions.

Peripheral component interconnect (PCI) Host bridge 114 connected to I/O bus 112 provides an interface to PCI local bus 115. A number of Input/Output adapters 120–121 may be connected to PCI bus 115 through EADS 116 via PCI buses 118–119. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100. Devices such as modems or network adapters may be supported through each of PCI I/O adapters, such as adapters 120–121.

A PCI host bridge 122 is also provided that includes one or more IDE controllers. An IDE controller provides for the attachment of IDE compatible storage devices 128 and 129. These IDE devices are any devices that adhere to the ATA specification and may include devices such as fixed disk drives and CD-ROM drives.

A memory mapped graphics adapter 148 may be connected to I/O bus 112 through PCI Host Bridge 140 and EADS 142 (PCI-PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132 which is in turn connected to PCI I/O Adapter 136 via PCI Bus 133. The ISA bus access pass-through logic 194 forwards PCI accesses destined to the PCI/ISA bridge 193. The NVRAM 192 storage is connected to the ISA bus 196. The service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3A:
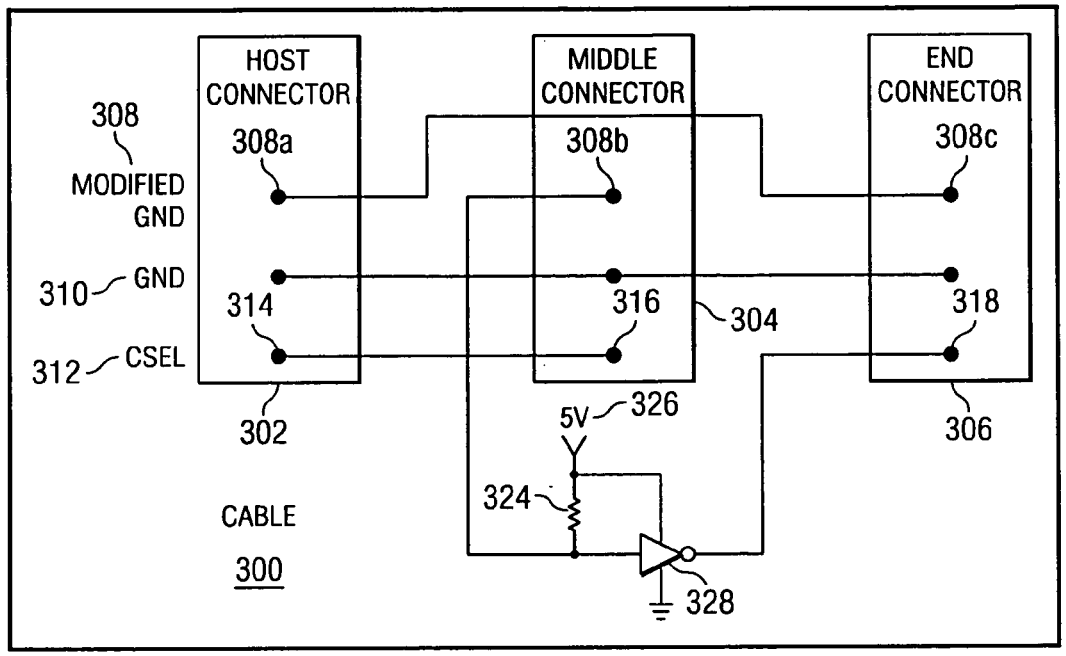
FIG. 3A depicts a block diagram of modified connectors within a modified IDE cable in accordance with the present invention.

FIG. 3A is a block diagram of modified connectors within a modified IDE cable 300 in accordance with the present invention. Cable 300 includes modified connectors: a host connector 302, a middle connector 304, and an end connector 306. In accordance with the ATA specification, there are several ground wires within an IDE cable. According to the present invention, one of the ground wires has been modified to isolate one of its ground pins from the other of its ground pins. This has been implemented by isolating the ground pin in one of the connectors. For example, connector 304 has been modified so that pin 308*b* is isolated from ground wire 308 and interconnected ground pin 308*a* of host connector 302 and ground pin 308*c* of end connector 306. The remaining ground wires, including ground wire 310, remain unchanged in cable 300.

According to the ATA specification, when a device that is configured to the cable select mode detects that its CSEL pin is at a logical zero, that device will configure itself as a master. When the device detects that its CSEL pin is at a logical one, that device will configure itself as a slave. The present invention is a method and system that drives the CSEL pins of each device that is coupled to the IDE cable to the appropriate value causing each device to configure itself to the appropriate master or slave mode.

A resistor 324 has been added that is coupled at one end to 5 Volts, as depicted by reference 326. The other end of resistor 324 is coupled to the input of an inverter 328 the input of the inverter is coupled to the modified ground pin 308*b*. The output of inverter 328 is provided to pin 318. Cable select wire 312 interconnects cable select pin 316 of middle connector 304 to cable select pin 314 of host connector. Any known method may be used to provide power and ground to inverter 328 within cable 300.

One of the ground pins for a particular connector, such as pin 308*b*, has been isolated from the other connectors' pins for this particular ground wire. Thus, if a device, such as device 500, is attached to middle connector 304, pin 502 is coupled to pin 308*b*. Thus, pin 308*b* is pulled to ground by pin 502. When pin 308*b* is pulled to ground, inverter 328 receives the ground signal and drives pin 318 to 5 volts. When pin 318 is driven to 5 volts, any device coupled to end connector 306 will configure itself as a slave. Pin 316 is grounded through its connection to ground through pin 314, and thus the device coupled to middle connector 304 will configure itself as a master.

On the other hand, if no device is coupled to middle connector 304 and a device is coupled to end connector 306, pin 308*b* will be pulled to 5 volts by resistor 324 resulting in inverter 328 driving pin 318 to ground. In this case, no device is coupled to middle connector 304, and the device coupled to end connector 306 will have a zero at pin 318 causing the device coupled to end connector 306 to configure itself as a master.

In this manner, the IDE cable and its connectors will cause IDE devices that are jumpered to operate in a cable select mode to automatically and correctly configure themselves as either master or slave devices regardless of the IDE devices' position on the cable. If a device is coupled to the middle connector, the cable and its connectors will cause that device to automatically configure itself to be a master device and will cause any device that is coupled to the end connector to automatically configure itself to be a slave device. Alternatively, if no device is coupled to the middle connector, the cable and its connectors will cause any device that is coupled to the end connector to automatically configure itself to be a master device.

The present invention is not limited to IDE cables. In some systems IDE signals may be physically distributed by a backplane instead of a cable. In this case, the backplane is used to distribute the IDE signals. Although a backplane may be used, the backplane will still include connectors for receiving and coupling the IDE devices to the backplane. These connectors may be modified as described above. In addition, one of the ground pins in one of the connectors distributed by the backplane should be isolated as described above. In this manner, the backplane may implement the present invention to achieve the same result.

Figure 3B:
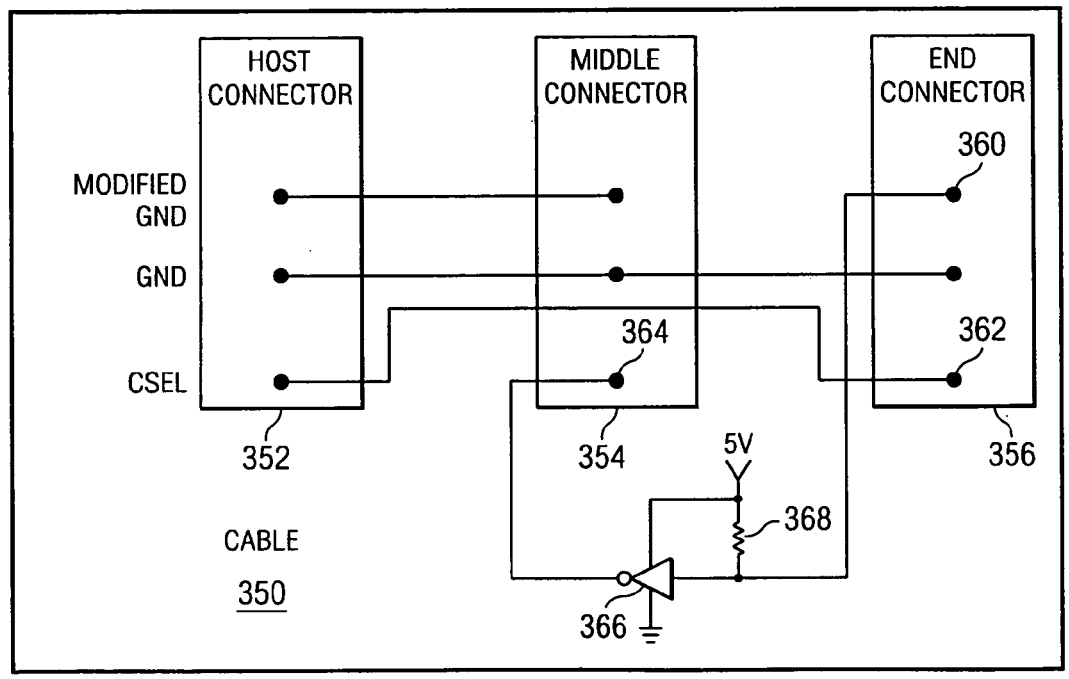
FIG. 3B depicts a block diagram of a second embodiment of modified connectors within a modified IDE cable in accordance with the present invention.

FIG. 3B depicts a block diagram of a second embodiment of modified connectors within a modified IDE cable in accordance with the present invention. The present invention may also be implemented in a system whereby if a device is coupled to the end connector that device will be a master and a device coupled to the middle connector will be a slave device. Alternatively, if a device is coupled to the middle connector and no device is coupled to the end connector that device coupled to the middle connector will be the master device. Cable 350 includes modified connectors 352, 354, and 356. For one of the ground wires, one of the ground pins in one of the connectors has been modified by isolating it from the other ground pins as depicted at reference 360.

Figure 5A:
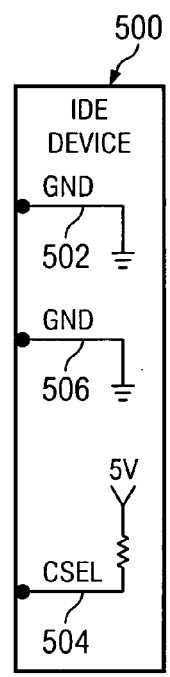
FIG. 5A depicts internal connections within an IDE device of selected pins in accordance with the prior art.
Figure 5B:
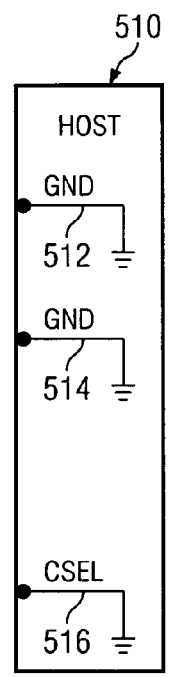
FIG. 5B depicts internal connections within an IDE host controller of selected pins in accordance with the prior art.
Figure 4:
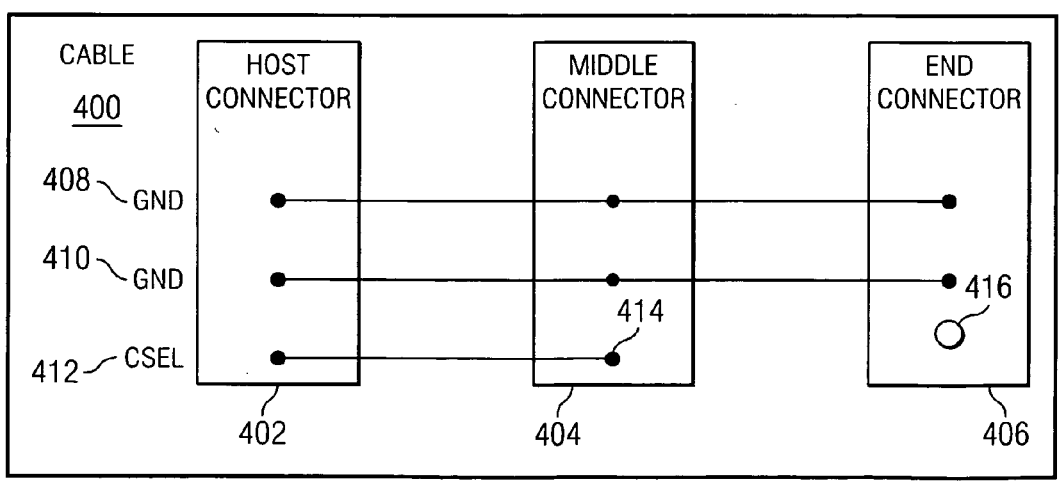
FIG. 4 illustrates a cable that conforms to the ATA specification for IDE cables in accordance with the prior art.

CSEL pin 362 within end connector 356 has been coupled to ground. CSEL pin 364 receives the output of inverter 366. When a device is coupled to end connector 356, the input to inverter 366 is pulled to ground by pin 502 within device 500 (see FIG. 5A). When the input to inverter 366 is pulled to ground, inverter 366 outputs a logical one and drives CSEL pin 364 to a logical one thus causing any device coupled to middle connector 354 to configure itself as a slave device. The device coupled to end connector 356 will configure itself as a master device because CSEL pin 362 is pulled to ground.

Alternatively, if no device is coupled to end connector 356, the input to inverter 366 will be pulled to 5 volts by resister 368, and will thus output a logical zero driving CSEL pin 364 to a logical zero. Therefore, the device coupled to middle connector 354 will configure itself as a master device.

Those skilled in the art will recognize that the present invention may be utilized in a system whereby the functionality of the middle and end connectors are switched. For example, a standard cable may be defined such that a device configured as a cable select device that is attached to the connector at the middle of the cable will become the slave device, while a device configured as a cable select device that is attached to the connector at the end of the cable will become the master device. This standard design could be modified as described by the present invention so that one of the ground pins is isolated in a connector from the other ground pins and to add an inverter, resistor, and power source to provide the functionality described by the present invention.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A modified IDE cable for causing an IDE device set to cable select mode to automatically configure itself appropriately as either a master or a slave device regardless of said IDE device's location on said modified IDE cable, said cable comprising:
    said IDE device including a cable select pin wherein said IDE device utilizes a value of said cable select pin to determine whether said IDE device should configure itself as either a master or a slave, further wherein said IDE device is a master when said value of said cable select pin is a master value and said IDE device is a slave when said value of said cable select pin is a slave value;
    a middle connector including a first ground pin coupled to an input of an inverter and a first cable select pin for coupling said middle connector to a cable select wire;
    a host connector for coupling to a host controller, said host connector including a second ground pin for coupling said host connector to a first ground wire, and a second cable select pin for coupling said host connector to said cable select wire; and
    an end connector including a third ground pin for coupling said end connector to said first ground wire, wherein said first ground pin is isolated from said second ground pin and from said third ground pin, said end connector further including a third cable select pin coupled to an output of said inverter, wherein said third cable select pin is isolated from said cable select wire, wherein said first cable select pin is a master value and said inverter pulls said third cable select pin to said slave value when said IDE device is coupled to said middle connector; and wherein said inverter pulls said third cable select pin to said master value when said IDE device is coupled to said end connector wherein no IDE device is coupled to said middle connector.

2. The cable according to claim 1, further comprising:
    said first ground pin being coupled to ground when said middle connector is coupled to said IDE device;
    said input to said inverter being coupled to ground when said middle connector is coupled to said IDE device; and
    said inverter generating said slave value as said output of said inverter when said input to said inverter is coupled to ground, wherein said inverter generates said slave value when said middle connector is coupled to said IDE device.

3. The cable according to claim 1, further comprising:
    said input to said inverter being coupled to a voltage source;
    said input to said inverter being pulled to a value of said voltage source when no IDE device is coupled to said middle connector; and
    said inverter generating said master value as said output of said inverter when said input to said inverter is pulled to said value of said voltage source, wherein said inverter generates said master value when said middle connector is not coupled to any IDE device.

4. The cable according to claim 1, further comprising:
    a cable select pin in said end connector being driven to said master value and a cable select pin in said middle connector being driven to said slave value when said IDE device is coupled to said end connector while said second IDE device is coupled to said middle connector.

5. The cable according to claim 1, wherein a plurality of IDE signals are distributed by a backplane.

6. The cable according to claim 5, wherein said backplane further comprises connectors for receiving and coupling said IDE device to said backplane.

7. A method for causing an IDE device set to cable select mode to automatically configure itself appropriately as either a master or a slave device regardless of said IDE device's location on an IDE cable, said method comprising the steps of:
    said IDE device including a cable select pin wherein said IDE device utilizes a value of said cable select pin to determine whether said IDE device should configure itself as either a master or a slave, further wherein said IDE device is a master when said value of said cable select pin is a master value and said IDE device is a slave when said value of said cable select pin is a slave value;
    coupling a cable select wire to a first cable select pin of a middle connector wherein said middle connector further comprises a first ground pin;
    coupling said cable select wire to a second cable select pin of a host connector for coupling to a host wherein said host connector further comprises a second ground pin;
    coupling a first ground wire to said second ground pin;
    coupling a second cable select pin of said host connector to said cable select wire;
    coupling an output of said inverter to a third cable select pin of an end connector wherein said second cable select pin and said third cable select pin are isolated, said end connector further comprises a third ground pin;
    coupling said first ground pin to an input of an inverter wherein said first ground pin is isolated from said second ground pin and from said third ground pin;
    coupling said first ground wire to said third ground pin;
    pulling said third cable select pin to said slave value utilizing said inverter when said IDE device is coupled to said middle connector so that if a second IDE device is attached to said end connector, said second IDE device is configured as a slave, wherein said value of said IDE device is a master value; and
    pulling said third cable select pin to said master value utilizing said inverter when said IDE devices is coupled to said end connector when no IDE device is coupled to said middle connecter.

8. The method according to claim 7, further comprising:
    coupling said first ground pin to ground when said middle connector is coupled to said IDE device;
    coupling said input to said inverter to ground when said middle connector is coupled to said IDE device; and
    generating said slave value as said output of said inverter when said input to said inverter is coupled to ground, wherein said inverter generates said slave value when said middle connector is coupled to said IDE device.

9. The method according to claim 7, further comprising:
    coupling said input to said inverter to a voltage source;
    pulling said input to said inverter to a value of said voltage source when no IDE device is coupled to said middle connector; and generating said master value as said output of said inverter when said input to said inverter is pulled to said value of said voltage source, wherein said inverter generates said master value when said middle connector is not coupled to any IDE device.

10. The method according to claim 7, further comprising:
driving a cable select pin in said end connector to said master value and a cable select pin in said middle connector to said slave value when said IDE device is coupled to said end connector while said second IDE device is coupled to said middle connector.

11. A modified IDE cable for causing an IDE device set to cable select mode to automatically configure itself appropriately as either a master or a slave device regardless of said IDE device's location on said modified IDE cable, said cable comprising:

said IDE device including a cable select pin wherein said IDE device utilizes a value of said cable select pin to determine whether said IDE device should configure itself as either a master or a slave, further wherein said IDE device is a master when said value of said cable select pin is a master value and said IDE device is a slave when said value of said cable select pin is a slave value;

a middle connector including a first ground pin coupled to a first ground wire, said middle connector including a first cable select pin coupled to an output of an inverter;

a host connector for coupling to a host controller said host connector including a second ground pin coupled to said first ground wire, said host connector including a second cable select pin coupled to a cable select wire; and an end connector including a third ground pin coupled to an input of said inverter wherein said third ground pin being isolated from said ground wire, said end connector including a third cable select pin coupled to said cable select wire, wherein said first cable select pin is isolated from said cable select wire, wherein said inverter pulls said first cable select pin to said slave value when said IDE device is coupled to said end connector; and said inverter pulling said first cable select pin to said master value when said IDE device is coupled to said middle connector when no IDE device is coupled to said end connector.

12. The cable according to claim 11, wherein a plurality of IDE signals are distributed by a backplane.

13. The cable according to claim 12, wherein said backplane further comprises connectors for receiving and coupling said IDE device to said backplane.

* * * * *